March 31, 1964     L. A. FREEBURG     3,126,855
COMBINATION BOAT TRAILER AND FLOATING DRY DOCK Filed July 3, 1962     3 Sheets-Sheet 1

Lloyd A. Freeburg
INVENTOR.

BY

March 31, 1964 L. A. FREEBURG 3,126,855
COMBINATION BOAT TRAILER AND FLOATING DRY DOCK
Filed July 3, 1962 3 Sheets-Sheet 2

Lloyd A. Freeburg
INVENTOR.
BY
Attorneys

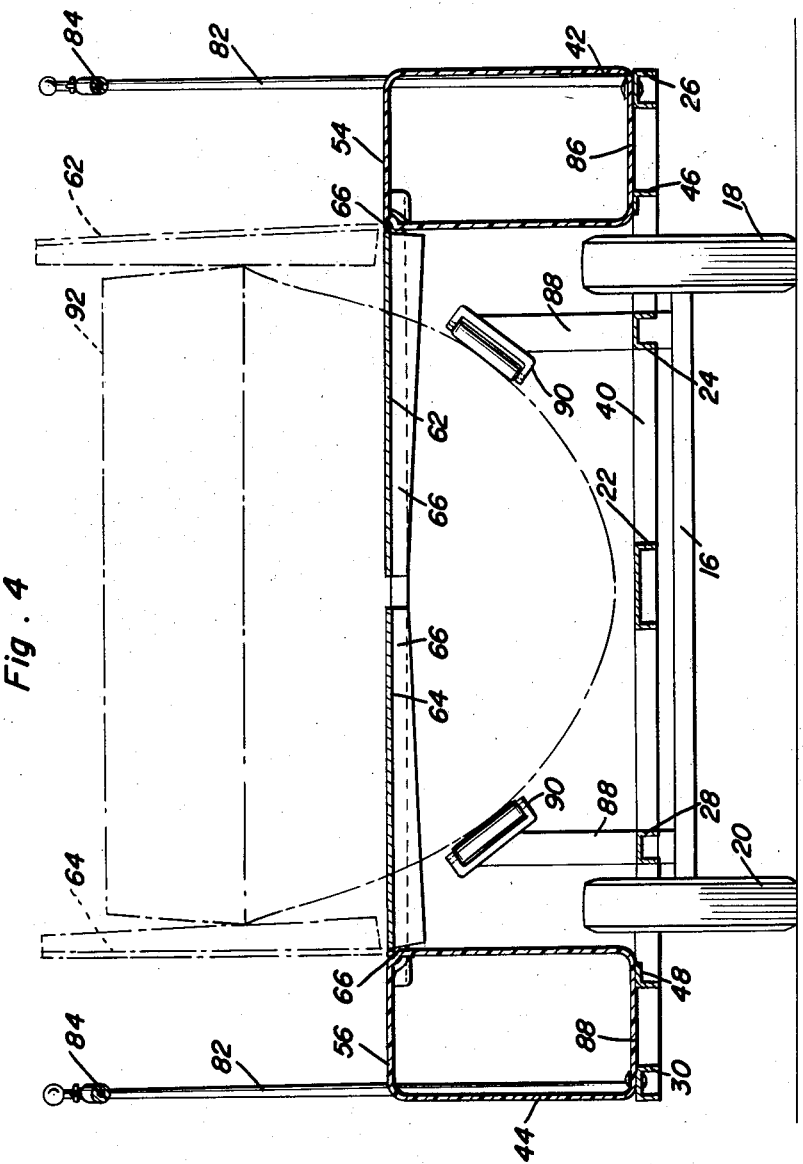

United States Patent Office

3,126,855
Patented Mar. 31, 1964

3,126,855
COMBINATION BOAT TRAILER AND FLOATING DRY DOCK
Lloyd A. Freeburg, % Flodin, Inc., Box 332, Sunnyside, Wash., assignor of fifty percent to Flodin Inc., Sunnyside, Wash., a corporation of Washington
Filed July 3, 1962, Ser. No. 207,248
4 Claims. (Cl. 114—45)

This invention relates to a novel and useful combination boat trailer and floating dry dock and more specifically to a trailer assembly provided with elongated longitudinally extending and laterally spaced pontoon members between which boat supporting means is positioned for the support of a boat between the pontoons of the trailer.

The forward end of the trailer is provided with hitch means adapted for securement to a towing vehicle and the pair of laterally spaced pontoons define a boat receiving slip into which a boat may be driven.

In addition, the boat trailer and the floating dock combination includes a pair of partial cover panels which each are pivotally supported to the inside upper longitudinal edge portion of a corresponding pontoon for movement between a substantially vertically disposed open position and a substantially horizontally disposed position projecting toward the other pontoon. The cover panels are of a width to span approximately one-half the distance between the laterally spaced pontoons whereby the free ends of the cover panels are disposed adjacent each other to form a supporting deck over the slip whose upper surface is substantially horizontally aligned with the upper surfaces of the pontoons. In this manner, when the slip is not occupied by a boat, the cover panels may be swung to the closed position in order to afford a large substantially uninterrupted deck surface.

The main object of this invention is to provide a boat trailer provided with a pair of elongated pontoons between which there is defined a boat receiving slip and which includes boat supporting means disposed between the laterally spaced pontoons whereby the boat trailer and floating dock combination may be utilized to transport a boat to and from a point of use and also be used as a floating dock while the boat is being used.

A further object of this invention, in accordance with the immediately preceding object, is to provide a boat trailer and floating dock combination including partial cover panels hinged to the adjacent top edges of the laterally spaced pontoons and swingable between substantially upwardly projecting vertically disposed positions and horizontally disposed positions with their free edges adjacent each other in order to form decking over the slip defined between the pontoons when a boat is occupying the slip.

Still another object of this invention is to provide a combination in accordance with the preceding objects whose boat supporting means are adapted to support a boat hull for longitudinal movement longitudinally of the slip defined between the pontoons and which are disposed in elevation relative to the normal water line of the pontoons so as to enable a boat to be driven into the rear end of the slip and up on the cradle means for at least partial support therefrom.

A final object of this invention to be specifically enumerated herein is to provide a boat trailer and floating dock combination in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is an enlarged transverse vertical sectional view taken substantially upon the plane indicated by the section line 4—4 of FIGURE 2.

Figure 1:
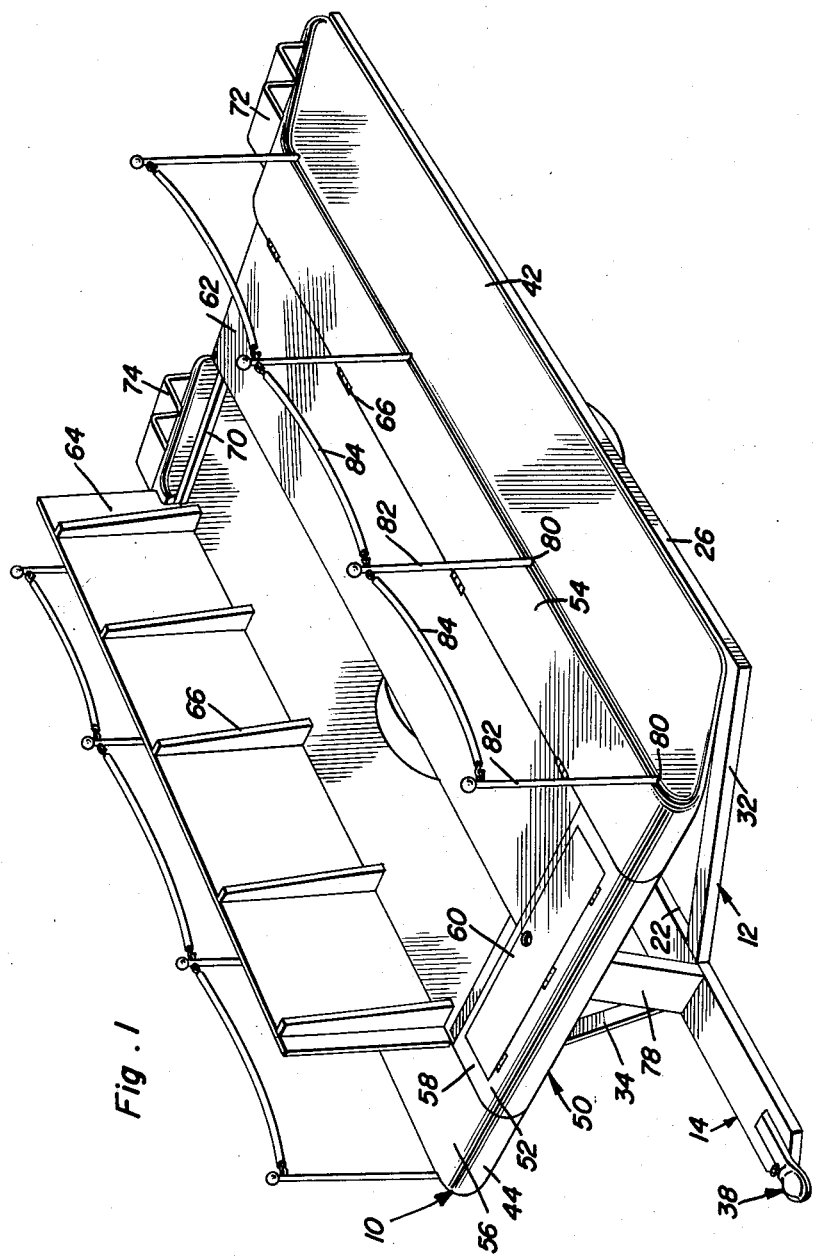
FIGURE 1 is a perspective view of the boat trailer and floating dock combination of the instant invention shown with one of the cover panels in the closed position and the other of the cover panels in the open position.
Figure 2:
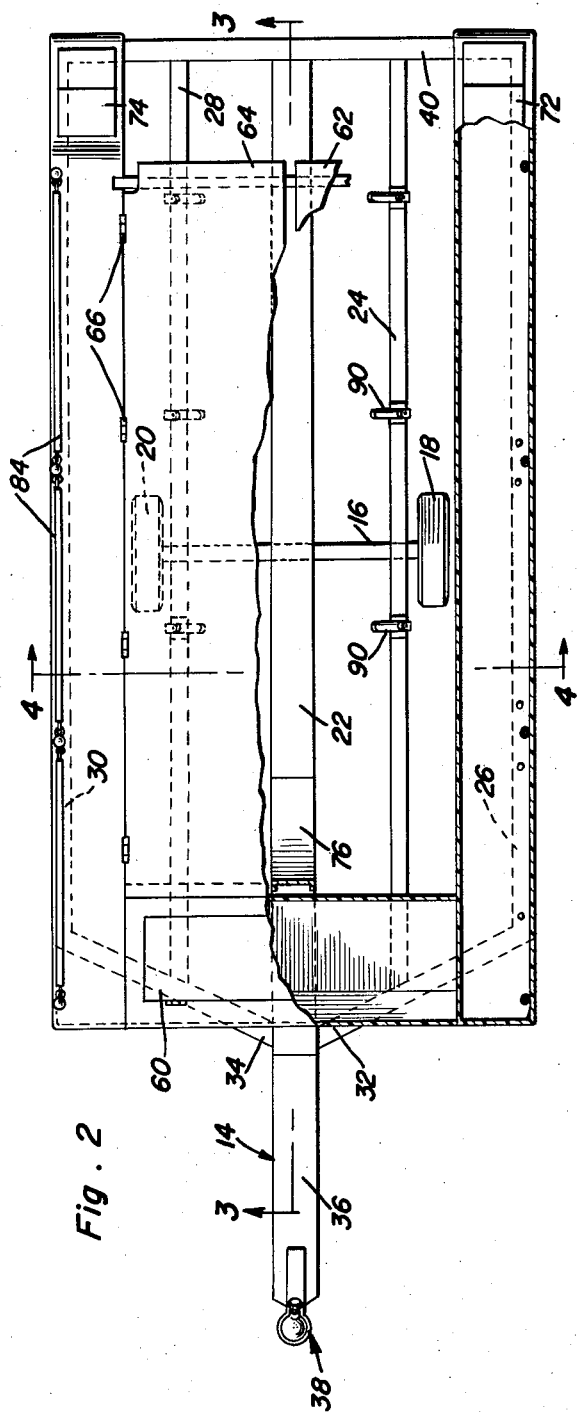
FIGURE 2 is a top plan view of the embodiment illustrated in FIGURE 1 with parts thereof being broken away and shown in section.
Figure 3:
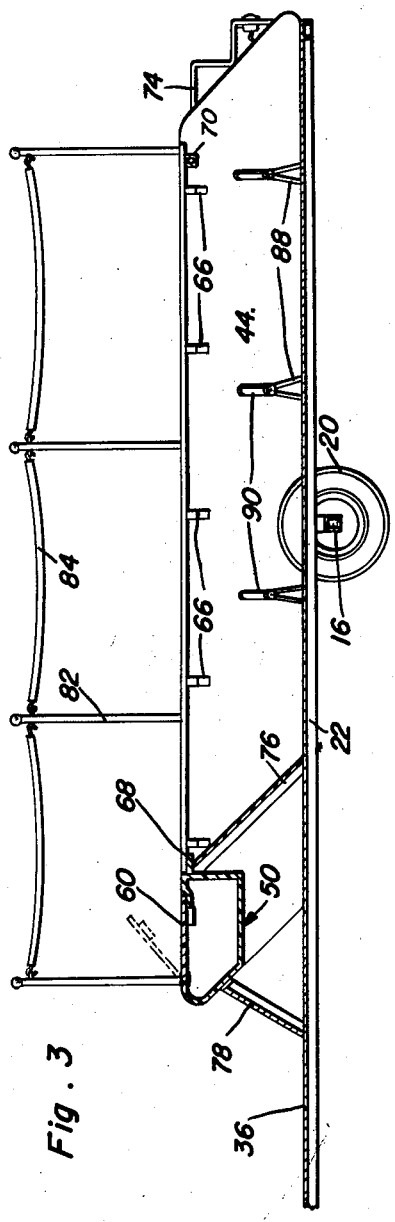
FIGURE 3 is a fragmentary longitudinal vertical sectional view taken substantially upon the plane indicated by the section line 3—3 of FIGURE 2.

Referring now more specifically to the drawings, the numeral 10 generally designates the boat trailer and floating dock comprising the instant invention. The boat trailer and floating dock combination 10 includes a main frame generally referred to by the reference numeral 12 including hitch means generally referred to by the reference numeral 14 at its forward end and a transversely extending axle 16 provided with rotatable wheels 18 and 20 at its opposite ends.

The main frame 12 includes a center longitudinally extending beam or brace member 22 and two pair of longitudinally extending opposite side brace members 24, 26 and 28, 30. A pair of diagonal brace members 32 and 34 interconnect the forward ends of the brace members 24 and 26 and the brace members 28 and 30 respectively and are secured at their adjacent ends to opposite sides of the forward end of the main or center brace member 22. The main or center brace member 22 extends beyond the diagonal brace members 32 and 34 and defines a tongue 36 which is provided with a socket hitch assembly generally referred to by the reference numeral 38 at its forward end which is adapted to be secured to a ball hitch element carried by a towing vehicle.

The axle assembly 16 is supported from the longitudinal brace members 24 and 28 and the rear ends of the brace members 22, 24, 26, 28 and 30 are rigidly interconnected by means of a rear transverse brace member 40.

A pair of elongated and longitudinally extending pontoons 42 and 44 are disposed in laterally spaced relation and supported from the longitudinal brace members 26 and 30 respectively. In addition, each of the pontoons 42 and 44 are supported by means of longitudinally extending brace members 46 and 48 respectively which comprise a part of the frame 12. The brace members 46 and 48 generally parallel and are disposed inwardly of the brace members 26 and 30.

A transverse brace assembly generally referred to by the reference numeral 50 is secured between the inner portions of the forward ends of the pontoons 42 and 44 and includes an upper surface 52 which is substantially horizontally aligned with the upper surfaces 54 and 56 of the pontoons 42 and 44. The upper surface 52 has an opening 58 therein and a closure door 60 is provided and is hingedly secured to the transverse brace member 50 comprising a closure for the opening 58.

A pair of partial cover panels 62 and 64 are provided and are pivotally secured as by means of hinges 66 to the adjacent upper longitudinal edges of the pontoons 42 and 44 respectively. The partial cover panels 62 and 64 are provided with transverse brace members 66 and it will be noted that the rear edge of the transverse brace member 50 includes a support flange 68 and that a removable transverse brace member 70 is secured between the rear ends of the pontoons 42 and 44. The partial cover panels 62 and 64 are swingable between the upwardly projecting substantially vertically disposed positions illustrated in phantom lines in FIGURE 4 and substantially horizontally disposed positions such as those illustrated in solid lines in FIGURE 4 with the opposite ends of the cover panels 62 and 64 being supported from the flange 68 and the transverse brace member 70.

A pair of step assemblies 72 and 74 are secured to the rear ends of the pontoons 42 and 44 which are inclined downwardly and rearwardly and a bow stop 76 is inclined forwardly and upwardly and is secured between the center or main brace member 22 and the rear portion of the transverse brace member 50. In addition, a rearwardly and upwardly inclined brace 78 is secured between the tongue 36 and the forward portion of the transverse brace member 50.

Each of the pontoons 42 and 44 is provided with a plurality of upwardly opening sockets 80 and the lower ends of a plurality of standards 82 are secured in the sockets 80. Flexible rail sections or ropes 84 are secured between adjacent ones of the standards or posts 82 so as to form a railing along the outer side portions of the pontoons 42 and 44.

With attention now directed to FIGURE 4 of the drawings, it may be seen that the lower ends of the post or standards 82 project downwardly through the upper surfaces 54 and 56 of the pontoons 42 and 44 and are engaged with the lower walls 86 and 88 of the pontoons 42 and 44.

A plurality of roller support stands 88 project upwardly from the longitudinal brace members 24 and 28 and are topped by roller assemblies 90.

As can best be seen from FIGURE 4 of the drawings, a boat 92 is receivable in the slip defined between the pontoons 42 and 44 and may be supported from the roller assemblies 90.

It is to be noted that the roller assemblies 90 are positioned in elevation relative to the pontoons 42 and 44 so that a boat may be driven into the rear end of the slip defined between the pontoons 42 and 44 and up on the boat supporting cradle means defined by the standards 88 and the roller assemblies 90. In this manner, with both the boat 92 and the boat trailer and floating dry dock combination 10 in the water, the boat 92 when positioned on the supporting roller assemblies 90 will have only a portion of its weight supported by the roller assemblies and the remainder of its weight supported by the buoyant force of the water in which the combination 10 is floating pushing upwardly on the hull of the boat 92.

In operation, the combination 10 may be utilized to carry the boat 92 to a point of use and may be allowed to roll downwardly into the water a sufficient distance to be buoyed up by the latter. Then, the boat 92 may be untied from the combination 10 and backed out of the slip defined between the pontoons 42 and 44 under its own power. Thereafter, the partial cover panels 62 and 64 may be pivoted to the closed position illustrated in solid lines in FIGURE 4 of the drawings in order to form a large deck area over the top of the combination 10. Then, when it is desired to retrieve the boat 92, the cover panels 62 and 64 may be swung to their open positions and the boat 92 may be driven into the rear of the slip defined between the pontoons 42 and 44 under its own power and up onto and partially supported by the roller assemblies 90 defining the boat cradle means of the combination 10. After the boat 92 has been secured within the slip, it may be used to slowly propel the combination 10 to a loading ramp at which point the tongue of the trailer combination 10 may be coupled to a towing vehicle in order that the combination 10 and the boat 92 may be pulled from the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boat trailer and floating dock combination comprising an elongated main frame adapted to be trailed behind a draft vehicle at road speeds and having hitch means at its forward end adapted for securement to a towing vehicle and dependingly supported ground engaging support wheels, said combination including a pair of elongated horizontally disposed pontoons fixedly supported along their lower portions from said main frame and extending longitudinally of the latter in laterally spaced relation and defining a rearwardly opening boat hull receiving slip therebetween, a boat hull bottom supporting cradle means supported from said main frame and disposed between said pontoons adapted to support a boat hull from the bottom thereof in elevated position above the supporting surface for said support wheels, the rear end of said slip being free of permanent obstructions extending between said pontoons for the reception of a boat hull in said slip, said cradle means including means adapted to support said hull therefrom for longitudinal movement of the latter longitudinally of said slip, said cradle means being disposed in elevation relative to the normal water line of said combination in a manner to enable a boat to be driven into the rear end of said slip and up on said cradle means for at least partial support therefrom, the buoyancy of said wheeled combination being sufficient to support at least several persons with the upper portions of said pontoons disposed above the surface even when a boat is partially supported on said cradle means, said pontoons being rigidly interconnected adjacent the upper edges of the forward ends thereof by means of a transverse brace member, said pontoons each including a partial cover panel, means pivotally securing one edge of each panel to the corresponding pontoon for rotation about an axis extending longitudinally along the inside upper edge thereof for swinging movement of the free edge portions of said panels between open upwardly projecting substantially vertically disposed positions and closed generally horizontally disposed positions with the forward edges of said panels supported from said transverse brace member, a removable transverse brace member secured between the rear ends of said pontoons, the rear edges of said panels being supported from said removable transverse brace member when said panels are in the closed positions.

2. The combination of claim 1 wherein at least one of said pontoons has boarding steps constructed thereon to a point adjacent the top surface thereof.

3. The combination of claim 1 wherein said main frame includes two pairs of longitudinally extending laterally spaced brace members interconnected at points spaced longitudinally of said frame by transverse brace members, said pontoons being supported from the pair of remote outside brace members and said cradle means being supported from the inside pair of adjacent brace members.

4. A boat trailer and floating dock combination comprising an elongated main frame having hitch means at its forward end adapted for securement to a towing vehicle and dependingly supported ground engaging support wheels, said combination including a pair of elongated pontoons supported from and extending longiudinally of said main frame in laterally spaced relation and defining a rearwardly opening boat hull receiving slip therebetween, boat hull bottom supporting cradle means supported from said main frame and disposed between said pontoons adapted to support a boat hull from the bottom thereof in elevated position above the supporting surface for said support wheels, the rear end of said slip being free of obstructions for the reception of a boat hull in said slip, said pontoons being rigidly interconnected adjacent the upper edges of the forward ends thereof by means of a transverse brace member, said pontoons each including a partial cover panel, means pivotally securing one edge of each panel to the corresponding pontoon for rotation about an axis extending longitudinally along the inside upper edge thereof for swinging movement of the free edge portions of said panels between open upwardly projecting substantially vertically disposed positions and closed generally horizontally disposed positions with the forward edges of said panels supported from said transverse brace member, a removable transverse brace member secured between the rear ends of said pontoons, the rear edges of said panels being supported from said removable transverse brace member when said panels are in the closed positions.

References Cited in the file of this patent
UNITED STATES PATENTS

| | | |
|---|---|---|
| 2,774,322 | Harris | Dec. 18, 1956 |
| 2,876,728 | Luger | Mar. 10, 1959 |
| 2,917,194 | Streater | Dec. 15, 1959 |
| 2,977,010 | Okey | Mar. 28, 1961 |
| 3,035,283 | Mott | May 22, 1962 |
| 3,058,756 | Holsclaw | Oct. 16, 1962 |
| 3,064,282 | Kangas | Nov. 20, 1962 |
| 3,065,721 | Roudabush | Nov. 27, 1962 |